(12) United States Patent
Bleckmann et al.

(10) Patent No.: US 6,988,395 B1
(45) Date of Patent: Jan. 24, 2006

(54) METHOD FOR DETECTING AND EVALUATING THE CONDITIONS OF VEHICLE MOVEMENT DYNAMICS FOR A MOTOR VEHICLE

(75) Inventors: Hans Bleckmann, Bad Nauheim (DE); Marius Goslar, Braunschweig (DE)

(73) Assignees: Continental AG Vahrenwalder, Hannover (DE); Continental Teves AG & Co., oHG, Frankfurt (DE)

( * ) Notice: Subject to any disclaimer, the term of this patent is extended or adjusted under 35 U.S.C. 154(b) by 164 days.

(21) Appl. No.: 10/088,193

(22) PCT Filed: Sep. 14, 2000

(86) PCT No.: PCT/EP00/08989

§ 371 (c)(1),
(2), (4) Date: Sep. 12, 2002

(87) PCT Pub. No.: WO01/19654

PCT Pub. Date: Mar. 22, 2001

(30) Foreign Application Priority Data

Sep. 15, 1999 (DE) .......................................... 199 44 098
May 26, 2000 (DE) .......................................... 100 26 111
Sep. 7, 2000 (DE) .......................................... 100 44 291

(51) Int. Cl.
*G01M 19/00* (2006.01)

(52) U.S. Cl. ..................................................... 73/118.1
(58) Field of Classification Search ..................... 701/1, 701/70, 41, 81; 303/146; 280/5.507; 73/118.1; 324/207.21; 100/169
See application file for complete search history.

(56) References Cited

U.S. PATENT DOCUMENTS

| 5,402,344 A | * | 3/1995 | Reister et al. ......... 364/424.05 |
| 5,408,411 A | * | 4/1995 | Nakamura et al. ..... 364/424.01 |
| 5,455,770 A | * | 10/1995 | Hadeler et al. ........ 364/426.01 |
| 5,913,240 A | * | 6/1999 | Drahne et al. ................ 73/146 |
| 5,957,987 A | * | 9/1999 | Sudo et al. .................... 701/41 |
| 6,219,609 B1 | * | 4/2001 | Matsuno et al. .............. 701/72 |
| 6,330,496 B1 | * | 12/2001 | Latarnik et al. ............... 701/1 |
| 6,336,364 B1 | * | 1/2002 | Parker et al. ................. 73/462 |
| 6,502,014 B1 | * | 12/2002 | Herrmann et al. ............. 701/1 |
| 6,526,334 B1 | * | 2/2003 | Latarnik et al. ............... 701/1 |

FOREIGN PATENT DOCUMENTS

| DE | 38 12 904 | 9/1989 |
| DE | 44 35 160 | 4/1996 |
| DE | 196 49 137 | 6/1997 |
| DE | 196 07 050 | 8/1997 |
| DE | 197 44 725 | 4/1999 |
| WO | 00 03901 | 1/2000 |

OTHER PUBLICATIONS

Search Report of the German Patent Office for Appln 10044291.9.

* cited by examiner

Primary Examiner—Edward Lefkowitz
Assistant Examiner—Octavia Davis
(74) Attorney, Agent, or Firm—Honigman Miller Schwartz and Cohn LLP

(57) ABSTRACT

The present invention relates to a method and a control circuit for detecting and evaluating the conditions of vehicle movement dynamics for a motor vehicle by means of wheel force sensors, preferably tire sensors, which take the preadjusted air slot between at least one rotating encoder and at least one pick-up for measuring data into account as a standard for the transverse forces that act on the wheel or on the tire. In order to reduce the errors in the evaluation of wheel forces, especially of deformations of the wheel rim and/or the tire detected by means of tire sensors, the air-slot-dependent operating point of the output signal of the pick-up for measuring data or a signal-conditioning device is set irrespective of the preadjustment of the said point which was made during predetermined driving behavior.

10 Claims, 2 Drawing Sheets

METHOD FOR DETECTING AND EVALUATING THE CONDITIONS OF VEHICLE MOVEMENT DYNAMICS FOR A MOTOR VEHICLE

This application is a 371 of PCT/EP00/08989 filed Sep. 9, 2000.

TECHNICAL FIELD

The present invention generally relates to electronic sensors and more particularly relates to a method and a control circuit for detecting and evaluating the conditions of vehicle movement dynamics for a motor vehicle by means of wheel force sensors, preferably tire sensors.

BACKGROUND OF THE INVENTION

Many methods for controlling the driving behavior of a vehicle are known in the art which use tire sensors for sensing the forces and moments that act on the tires. The term 'tire sensor (SWT sensor)' in this context refers to the encoder mounted in or on the tire and at least one pick-up for measuring data that is associated with the encoder and mounted on the chassis in a stationary manner. Whereas in EP 0 444 109 B1 the deformation of the tire profile area of the tire, i.e., the tire print, is monitored, WO 96/10505 proposes detecting the deformation of the side wall of a tire, i.e., torsion deformations, by measuring a period of time that elapses between the passing of at least two markings arranged on the rotating wheel at a different radius relative to the axis of rotation. WO 97/44673 describes a tire sensor which detects a variation of the phase position and/or the amplitude between output signals sent by pick-ups for measuring data when the tire is deformed due to forces acting on the tire. The size of the air slot between the encoder or the magnetic areas embedded into the tire side wall and the e.g. active, magnetoresistive pick-ups for measuring data produce the signal which is used for the allocation of the lateral or transverse forces that act upon the tire. Consequently, the variations of the signals established by the pick-up for measuring data reproduce the deformations or variations of the tire side wall which are caused by the transverse forces that act on the wheels, while the change in the phase position between the two pick-ups for measuring data which are arranged on an outside and an inside radius relative to the axis of rotation of the wheel define a signal for the calculation of the longitudinal forces.

Another air tire equipped with a magnetic encoder is described in DE 196 20 582 A1 to which reference is made in full extent. The forces that act on a wheel having a tire of this type are reproduced in the way of signals correlated to forces in the pick-ups for measuring data or signal conditioning devices and used in motor vehicle control systems to regulate or control vehicles, especially for proportioning and/or modulating the brake pressure in the wheel brakes of the wheels.

When determining the functional correlation between the amplitude and/or phase signal and the forces that act on the wheels or the tires, measuring wheel rims are used as described, for example, in EP 0 352 788 A2. It is necessary in this context to arrange the pick-ups on the vehicle body or the wheel suspension so as to duplicate them in order to make the signals reproducible that are responsive to the air slot. Tolerances which occur in the arrangement or manufacture of the pick-ups for measuring data, and/or different wheel rim systems, e.g. with different rim offsets, cause discrepancies in determining the forces that act on the wheels or tires.

BRIEF SUMMARY OF THE INVENTION

An object of the present invention is to reduce the errors in the evaluation of wheel forces, especially of deformations of the wheel rim and/or the tire detected by means of tire sensors.

Advantageously, the preadjusted air slot between at least one rotating encoder and at least one pick-up for measuring data can be taken into account as a standard of the transverse forces that act on the wheel or the tire in order to detect and evaluate driving-dynamics conditions of a motor vehicle by means of wheel force sensors, preferably tire sensors. The fact that, according to the present invention, the air-slot-dependent operating point of the output signal of the pick-up for measuring data or a signal-conditioning device connected downstream of the pick-up for measuring data is set irrespective of the preadjustment of the said point, permits processing the output signal in an error-minimized fashion without impairing the signal quality, because the said signal is determined irrespective of the above preadjusted distance between the pick-up for measuring data and the encoder. Wheel rims with a different rim offset, yet with the same amount of rigidity, may be used. In addition, the distance of the pick-up for measuring data may be varied as desired by way of the area of resolution, without the need for adaptions of the functional representation between the amplitude and the transverse force.

Favorably, a generic control circuit is so configured that it comprises a determination unit which adjusts the air-slot-dependent operating point of the output signal of the pick-up for measuring data or a signal-conditioning device irrespective of the point's preadjustment, for detecting and evaluating driving-dynamics conditions of a motor vehicle by means of wheel force sensors, preferably by tire sensors, that take into account the preadjusted air slot between at least one rotating encoder or at least one pick-up for measuring data as a standard of the transverse forces acting on the wheel or on the tire.

According to the present invention, the method and the control circuit are so designed that the output signal is adapted to the vehicle-related distances between the pick-up for measuring data and the encoder. The features of a suitable method and a control circuit include that the output signal is standardized to at least one nominal value in the event of a stationary driving behavior free from longitudinal or transverse forces. The stationary driving behavior which is free from longitudinal or transverse forces is determined by means of input quantities which are furnished by conventional sensors and comprise at least the transverse acceleration, the longitudinal acceleration, and the steering angle velocity. Suitably, low longitudinal or transverse forces, or almost no such forces, act on the wheel or the tire at that moment. The following conditions, either individually or in any combination desired, can be made the basis of a stationary driving behavior which is free from longitudinal and transverse forces:

|transverse acceleration|<0.07 g
|longitudinal acceleration|<0.1 g
|steering angle|<1°
|steering angle velocity|<20 [degree/s]
forward driving
gearshift-dependent speed
    first gear <10 km/h
    second gear <30 km/h
    third gear <50 km/h
    fourth gear <100 km/h
    fifth gear <150 km/h
    when, preferably, all these conditions are stable for a period of time of roughly 70 msec, that value (nominal value) will be defined to which the output signal may be related (standardized).

The output signal furnished by the pick-up for measuring data or a signal-conditioning device is a sinusoidal alternating voltage or alternating current signal, whose nominal value is determined with each peak value of the half wave (amplitude) or with each change of the poles or markings of the encoder when the conditions of the stationary driving behavior are satisfied. Associated with the nominal value is a value which represents the zero point (offset) of the transverse force acting on the wheel and/or the tire.

The transverse forces are then determined during dynamic conditions of the vehicle in dependence on the amplitude variations according to the relation $$Amp_{usefuleffect} = \frac{Amp}{Amp_{nominalvalue}}$$

wherein Amp=output signal (amplitude), $Amp_{nominal\ value}$=standardized output signal (nominal value), $Amp_{usefuleffect}$=ratio between the amplitude and the standardized nominal amplitude. In addition, the amplitude variations may be attributed to changes in distance according to the relation $$Dis_{usefuleffect} = k * \ln\left(\frac{Amp}{Amp_{nom.value}}\right) =$$
$$k * (\ln(Amp) - \ln(Amp_{nom.value})) = k * \ln(Amp) - \text{nominal distance}$$

by means of the inverse function of the dependence of the amplitude on the air slot, wherein $Dis_{useful\ effect}$=changes in distance and k=negative constant which is determined from the characteristic curve of the sensor according to FIG. 3.

The transverse forces may then be determined basically as a function of the changes in distance.

An embodiment of the present invention will be explained in detail in the following by making reference to the accompanying drawings.

DETAILED DESCRIPTION OF THE PREFERRED EMBODIMENTS

Figure 1:
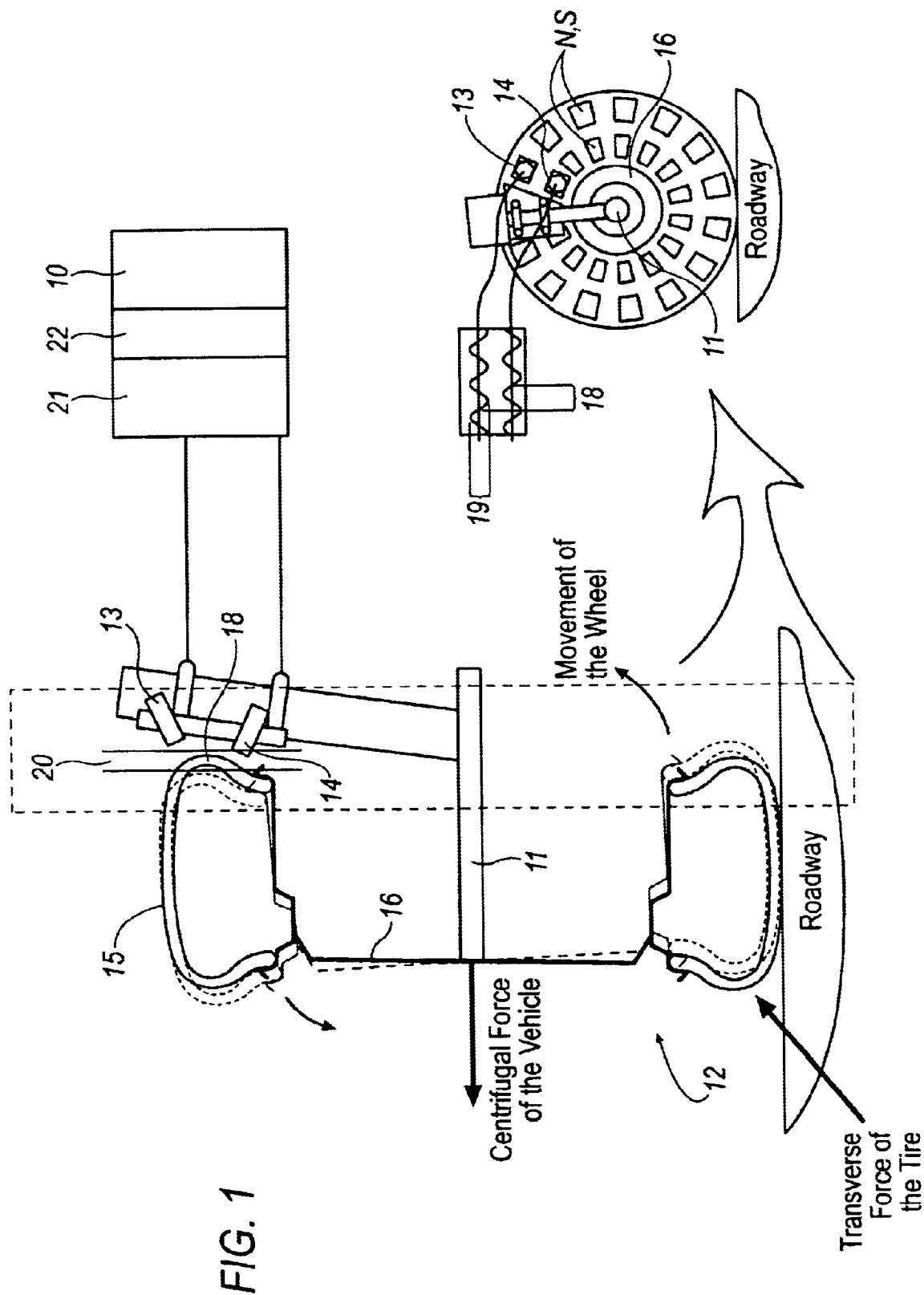
FIG. 1 is a schematic view of a control circuit for detecting and evaluating the deformations of the wheel when the wheel is subjected to transverse or lateral forces.

FIG. 1 shows a control circuit 10 which is connected to two magnetic-field-sensitive pick-ups for measuring data 13, 14 that are mounted on the chassis of a motor vehicle spaced radially from an axis of rotation 11 of wheel 12. The control circuit may be a component part of the pick-ups for measuring data or a separate unit or component of an ABS (anti-lock control system), TCS (traction slip control system), ESP (electronic driving stability control system), EHB (electrohydraulic brake control system), a vehicle suspension control system, and/or an EMB (electromechanic brake) control system. Vehicle tire 15 includes an encoder 17 with permanent-magnetic areas of alternating polarity N, S. The permanent-magnetic areas N, S are embedded in tire wall 17 of wheel 12.

A distance (air slot 20) is preadjusted between the encoder 18 and the pick-ups for measuring data 13, 14. When the wheel is deformed (=wheel rim 16 with tire 15) due to the longitudinal forces acting on the tire, the pick-ups for measuring data 13, 14 detect a variation of the phase position 18 which occurs between the test signals output by the pick-ups for measuring data 13, 14.

Further, at least one pick-up for measuring data 13 detects a change of the amplitude 19 of the test signal when the wheel 12 is deformed due to transverse forces acting on the tire 15. The test signal is amplified by an electronic circuit integrated in the sensor and converted into an output signal. The operating point of the output signal of the pick-up for measuring data 13 that is responsive to the air slot 20 is adjusted in a determination unit 21 irrespective of the preadjustment. When the vehicle exhibits a stationary driving behavior, the output signal is standardized to a nominal value, and the nominal value is correlated to the zero point of the transverse force by way of means 21. Subsequently, there is a reproducible correlation between the variation of the amplitude signal and the variation of the transverse force.

Figure 2:
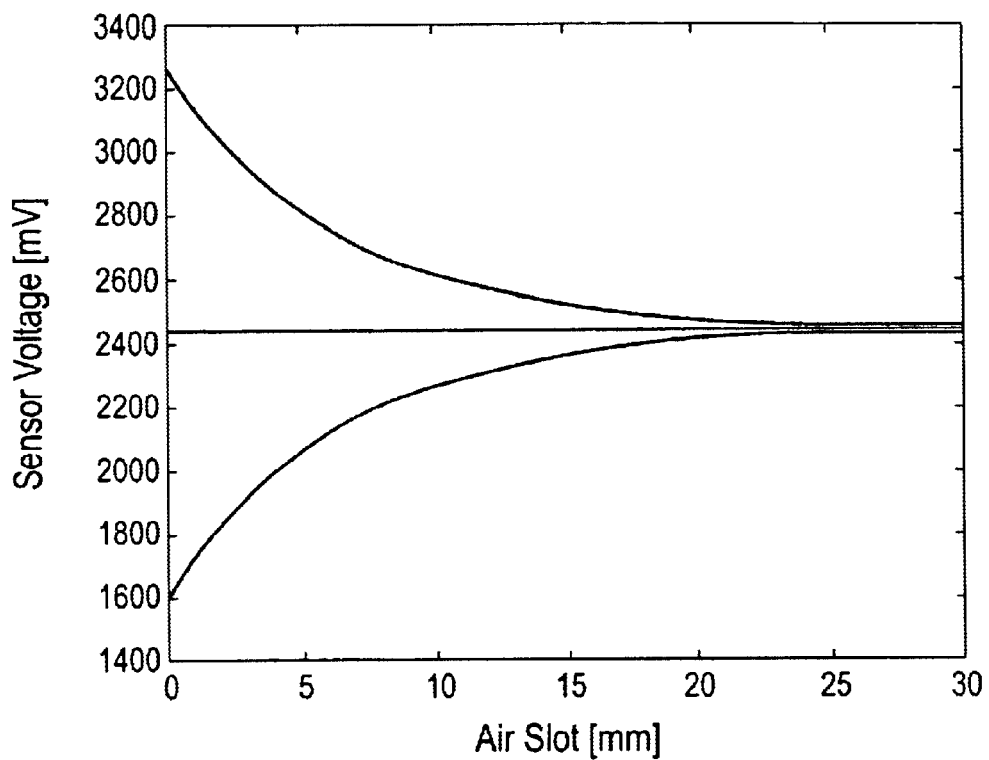
FIG. 2 shows a characteristic curve of the pick-up for measuring data of a tire sensor.
Figure 3:
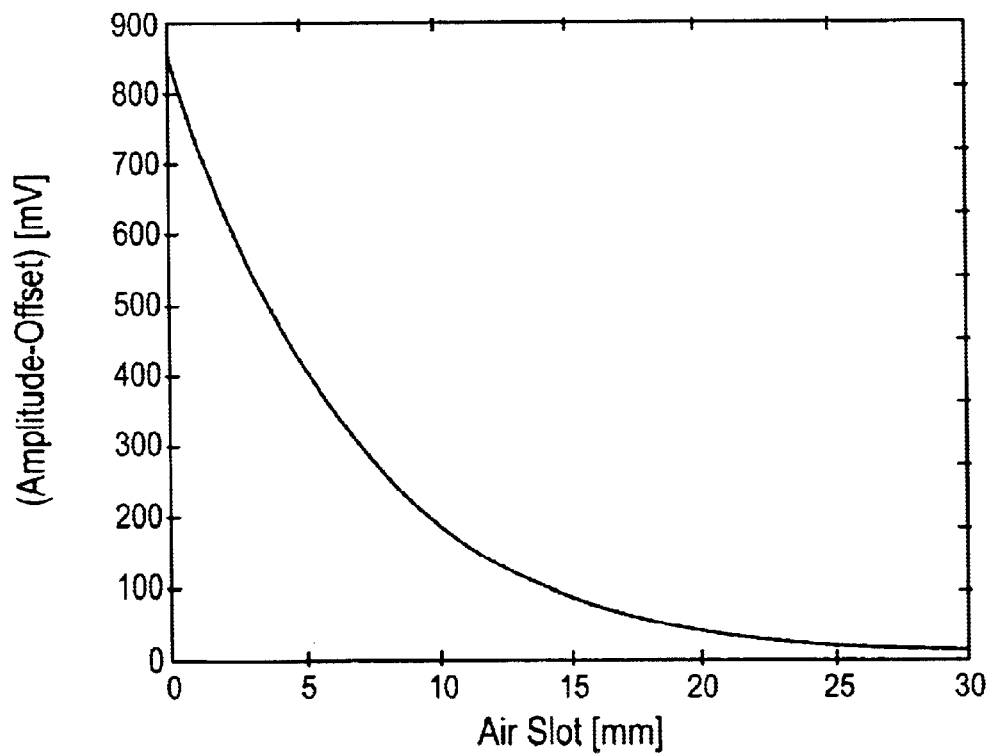
FIG. 3 shows the characteristic curve according to FIG. 2, with direct voltage and signs being removed.

The sinusoidal output signal which is produced by the effect of the encoder 17 at the magnetic-field-sensitive pick-up for measuring data 13 and the peak value of which varies with the air slot 20 may be an alternating voltage signal or an alternating current signal. The alternating current signal can be transformed into an alternating voltage signal in a signal-conditioning device associated with the pick-up for measuring data 13. FIGS. 2 and 3 show the correlation between the air slot 20 and the amplitude signal of the pick-up for measuring data 13, namely in a non-linear, almost exponential, form. The voltage of the output signal (sensor voltage) is plotted against the air slot 20 in FIG. 2. In FIG. 3, the same output signal is shown (as that of FIG. 2) except that the fixed voltage offset is removed and the negative portion of the signal is absent.

The operation of the method of the present invention is as follows:

After the start of the motor vehicle, the driving behavior is determined with signals of conventional sensors, such as transverse acceleration and longitudinal acceleration sensors, yaw rate sensors, steering angle sensors and like elements, because the adaption of the amplitude signal to the air slot 20 shall take place under stationary conditions only. To detect a stationary driving behavior free from longitudinal and/or transverse forces, it is preferred that the following conditions are satisfied:

|transverse acceleration|<0.07 g
|longitudinal acceleration|<0.1 g
|steering angle|<1°
|steering angle velocity|<20 [degree/s]
forward driving
gearshift-dependent speed
   first gear <10 km/h
   second gear <30 km/h
   third gear <50 km/h
   fourth gear <100 km/h
   fifth gear <150 km/h.

When these conditions are satisfied and remain stable for roughly 70 msec, a stationary driving behavior free from longitudinal or transverse forces prevails. The amplitude signal is then standardized to a nominal value with each peak value of the half wave or with each alternation of the magnetic areas N, S or poles or markings of the encoder 17. This nominal value is correlated with a zero point of the transverse force or force offset which was determined one time almost synchronously by a force measuring element, preferably a measuring wheel rim, under the influence of the forces that occur on wheel 12. The value of the transverse force is ideally 0 Newton when the driving behavior is stationary.

Starting from the standardized nominal value of the amplitude signal, which value is correlated with the force offset, the transverse forces during dynamic conditions of the vehicle are determined in dependence on the amplitude variations $Amp_{usefuleffect}$ according to the relation $$Amp_{usefuleffect} = \frac{Amp}{Amp_{nominalvalue}}$$

wherein Amp=output signal (amplitude), $Amp_{nominal\ value}$= standardized output signal (nominal value), $Amp_{useful\ effect}$= ratio between the amplitude and the standardized nominal amplitude. In addition, the amplitude variations may be attributed to changes in distance according to the relation $$Dis_{usefuleffect} = k * \ln\left(\frac{Amp}{Amp_{nom.value}}\right) =$$
$$k * (\ln(Amp) - \ln(Amp_{nom.value})) = k * \ln(Amp) - \text{nominal distance}$$

by means of the inverse function of the dependence of the amplitude on the air slot, wherein $Dis_{useful\ effect}$=changes in distance and k=negative constant which is determined from the characteristic curve of the sensor according to FIG. 3.

The transverse forces may then be determined basically as a function of the changes in distance.

What is claimed is:

1. Method for detecting and evaluating the conditions of vehicle movement dynamics for a motor vehicle by means of a wheel force sensor, which operates across a preadjusted air slot and senses a rotating encoder attached to the vehicle tire or wheel, comprising the steps of:
  a) operating the sensor under known conditions that result in minimal lateral forces exerted upon the rotating encoder,
  b) measuring a signal generated by the sensor under the conditions of step a) and using that measured signal as a reference value by which to determine the presence of a transverse force on the wheel,
  c) standardizing the measured signal to at least one nominal value when a driving behavior is stationary.

2. Method as claimed in claim 1, wherein the signal is a sinusoidal alternating voltage or alternating current signal, and the nominal value is determined with each peak value of the half wave (amplitude) or with each alternation of a pole or marking of the encoder.

3. Method as claimed in claim 1, wherein a value is associated with the nominal value which reproduces a zero point (offset) of the transverse force acting on the wheel or the tire.

4. Method as claimed in claim 3, wherein the transverse forces are determined in dependence on the amplitude variations according to the relation $$Amp_{usefuleffect} = \frac{Amp}{Amp_{nominalvalue}}$$

wherein Amp=output signal (amplitude), $Amp_{nominal\ value}$= standardized output signal (nominal value), $Amp_{usefuleffect}$= ratio between the amplitude and the standardized nominal amplitude.

5. Method as claimed in claim 4, wherein the amplitude variations are attributed by means of the inverse function to changes in distance according to the relation $$Dis_{usefuleffect} = k * \ln\left(\frac{Amp}{Amp_{nominalvalue}}\right)$$

wherein $Dis_{useful\ effect}$=changes in distance and k=negative constant.

6. Method as claimed in claim 4, wherein the transverse forces basically determined as a fiction of the changes in distance.

7. Method as claimed in claim 2, wherein the nominal value is maintained until the predetermined driving behavior is detected.

8. Control circuit for detecting and evaluating the conditions of vehicle movement dynamics for a motor vehicle by means of wheel force sensors, which take the preadjusted air gap between at least one rotating encoder and at least one pick-up for measuring data into account as a standard for the transverse forces that act on the wheel or on tire, comprising:
  a determination unit which sets an operating point of the output signal of the pick-up irrespective the air gap,
  means for standardizing the output signal to at least one nominal value when a vehicle movement behavior is stationary,
  wherein the output signal of the pick-up is a sinusoidal alternating voltage or alternating current signal, and the determination unit determines the nominal value with each peak value of the half wave (amplitude) of the voltage or current signal or with each alternation of a pole or a marking of the encoder.

9. Control circuit as claimed in claim 8, further comprising means attributing a value to the nominal value which represents the zero point (offset) of the transverse force, and in that the determination unit determines transverse force in dependence on the amplitude variations according to the relation $$Amp_{usefuleffect} = \frac{Amp}{Amp_{nominalvalue}}$$

wherein Amp=output signal (amplitude), $Amp_{nominal\ value}$= standardized output signal (nominal value), $Amp_{usefuleffect}$= ratio between the amplitude and the standardized nominal amplitude.

10. Control circuit as claimed in claim 9, wherein the determination unit attributes the amplitude variations by means of an inverse function to changes in distance according to the relation $$Dis_{usefuleffect} = k * \ln\left(\frac{Amp}{Amp_{nominalvalue}}\right)$$

wherein $Dis_{useful\ effect}$=changes in distance and k=negative constant.

* * * * *